(12) United States Patent
Harada

(10) Patent No.: US 10,120,624 B2
(45) Date of Patent: Nov. 6, 2018

(54) PRINTING SYSTEM AND PRINTING DEVICE

(71) Applicant: KYOCERA Document Solutions Inc., Osaka-shi, Osaka (JP)

(72) Inventor: Takashi Harada, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 15/609,056

(22) Filed: May 31, 2017

(65) Prior Publication Data

US 2017/0344323 A1 Nov. 30, 2017

(30) Foreign Application Priority Data

May 31, 2016 (JP) ................................ 2016-109048

(51) Int. Cl.
*H04N 1/04* (2006.01)
*G06F 3/12* (2006.01)
*G06K 9/00* (2006.01)

(52) U.S. Cl.
CPC .......... *G06F 3/1243* (2013.01); *G06F 3/1204* (2013.01); *G06F 3/125* (2013.01); *G06F 3/1286* (2013.01); *G06K 9/00442* (2013.01); *G06K 2209/011* (2013.01)

(58) Field of Classification Search
CPC ...... G06F 3/1243; G06F 3/125; G06F 3/1286; G06F 3/1204

USPC ........................................................ 358/1.11
See application file for complete search history.

(56) References Cited

U.S. PATENT DOCUMENTS

2003/0113021 A1* 6/2003 Shiotani ................. G06K 9/036
382/209
2016/0307075 A1* 10/2016 Yoshimura ............. G06F 15/18

FOREIGN PATENT DOCUMENTS

JP H06-139243 A 5/1994
JP 2010-204898 A 9/2010

* cited by examiner

*Primary Examiner* — Houshang Safaipour
(74) *Attorney, Agent, or Firm* — Viering, Jentschura & Partner mbB

(57) ABSTRACT

The printing system includes a handwritten character data extraction unit, a sample character data retrieval unit, a determination unit, a character practice worksheet creating unit, and a print control unit. The determination unit determines whether the matching ratio between a handwritten character extracted by the handwritten character data extraction unit and a sample character retrieved by the sample character data retrieval unit is equal to a first ratio or lower. If the determination unit determines that the matching ratio is equal to the first ratio or lower, the character practice worksheet creating unit creates a character practice worksheet containing the sample character that matches the handwritten character and a blank cell for handwriting practice formed next to the sample character. The print control unit controls the printing unit to print the character practice worksheet created by the character practice worksheet creating unit on paper.

10 Claims, 6 Drawing Sheets

PRINTING SYSTEM AND PRINTING DEVICE

CROSS-REFERENCE TO RELATED APPLICATION

This application claims priority to Japanese Patent Application No. 2016-109048, which was filed May 31, 2016, and is incorporated herein by reference in its entirety.

BACKGROUND

This disclosure relates to a printing system and a printing device.

Printing devices, typified by multifunction peripherals, read an image of an original document by using an image reading unit, and then emit light to a photoreceptor in a printing unit based on the read image to form an electrostatic latent image on the photoreceptor. Then, the printing devices apply charged toner onto the formed electrostatic latent image to make it into a visible image that is in turn transferred onto a sheet of paper and fixed, and output the sheet with the image fixed thereon.

By the way, there are some conventionally known output devices equipped with technologies for revising and correcting their output products.

A conventionally-known typical output device is a printing device including a reading means that reads out image data from an original document containing characters, a text acquisition means that acquires text data from the image data read by the reading means, the text data containing character data corresponding to the characters contained in the original document and format data associated with the character data, a block forming means that forms text blocks based on the format data, the text blocks each being composed of sequential character data formatted in the same way, an operation means that is used by a user to operate the printing device, a block rearrangement means that, when the user operates the operation means to specify a text block, rearranges the text data of the specified text block, a layout adjustment means that, if the rearrangement of the specified text block by the block rearrangement means causes an overlap area where a plurality of text blocks are overlapped with each other in the text data, moves the text block overlapping with the rearranged text block in a predetermined direction to eliminate the overlap, and a printing means that prints the text data on paper.

Another conventionally-known typical output device is a word processor with character font correcting function, including a tablet enabling handwriting input on a display screen. This word processor with character font correcting function includes an input means that enables input of a character handwritten on the display screen with a touch pen, a display means that outputs on the display screen the font of the input handwritten character and the corrected font, a parts information storage means that previously stores sample character fonts used for correction and parts data forming the sample character fonts, each of the sample character fonts and the parts data associated therewith being stored in pairs, a character recognizing means that reads the input handwritten character and recognizes its font from the parts information storage means, a parts retrieving means that decomposes the recognized handwritten character into parts and retrieves the closest parts data to the handwritten character from the parts information storage means, a font generating means that generates dot font data by correcting the font based on the size and arrangement of the handwritten character and the retrieved parts data, a font information storage means that successively stores the dot font data and code numbers associated with the created dot font data, and a display instruction means that instructs to call up the dot font data from the font information storage means onto the display means by using the code number.

SUMMARY

In one aspect of this present disclosure, a printing system creates and prints a character practice worksheet for handwriting practice. The printing system includes a printing device and a server connectable to the printing device. The server includes a storage unit that stores data of sample characters. The printing device includes an image reading unit, a printing unit, a handwritten character data extraction unit, a sample character data retrieval unit, a determination unit, a character practice worksheet creating unit, and a print control unit. The image reading unit reads an image of an original document. The printing unit forms an image to print it on paper. The handwritten character data extraction unit extracts a handwritten character, by means of optical character recognition (OCR), from the image of the original document read by the image reading unit. The storage unit stores data of sample characters. The sample character data retrieval unit retrieves data of a sample character that matches the handwritten character extracted by the handwritten character data extraction unit. The determination unit determines whether the matching ratio between the handwritten character extracted by the handwritten character data extraction unit and the sample character retrieved by the sample character data retrieval unit is equal to a first ratio or lower. If the determination unit determines that the matching ratio is equal to the first ratio or lower, the character practice worksheet creating unit creates a character practice worksheet containing the sample character that matches the handwritten character and a blank cell for handwriting practice formed next to the sample character. The print control unit controls the printing unit to print the character practice worksheet created by the character practice worksheet creating unit on paper.

In another aspect of this present disclosure, a printing device creates and prints a character practice worksheet for handwriting practice. The printing device includes an image reading unit, a printing unit, a handwritten character data extraction unit, a storage unit, a sample character data retrieval unit, a determination unit, a character practice worksheet creating unit, and a print control unit. The image reading unit reads an image of an original document. The printing unit forms an image to print it on paper. The handwritten character data extraction unit extracts a handwritten character, by means of optical character recognition (OCR), from the image of the original document read by the image reading unit. The storage unit stores data of sample characters. The sample character data retrieval unit retrieves data of a sample character that matches the handwritten character extracted by the handwritten character data extraction unit. The determination unit determines whether the matching ratio between the handwritten character extracted by the handwritten character data extraction unit and the sample character retrieved by the sample character data retrieval unit is equal to a first ratio or lower. If the determination unit determines that the matching ratio is equal to the first ratio or lower, the character practice worksheet creating unit creates a character practice worksheet containing the sample character that matches the handwritten character and a blank cell for handwriting practice formed next to the sample character. The print control unit controls the printing unit to print the character practice worksheet created by the character practice worksheet creating unit on paper.

DETAILED DESCRIPTION

Figure 1:
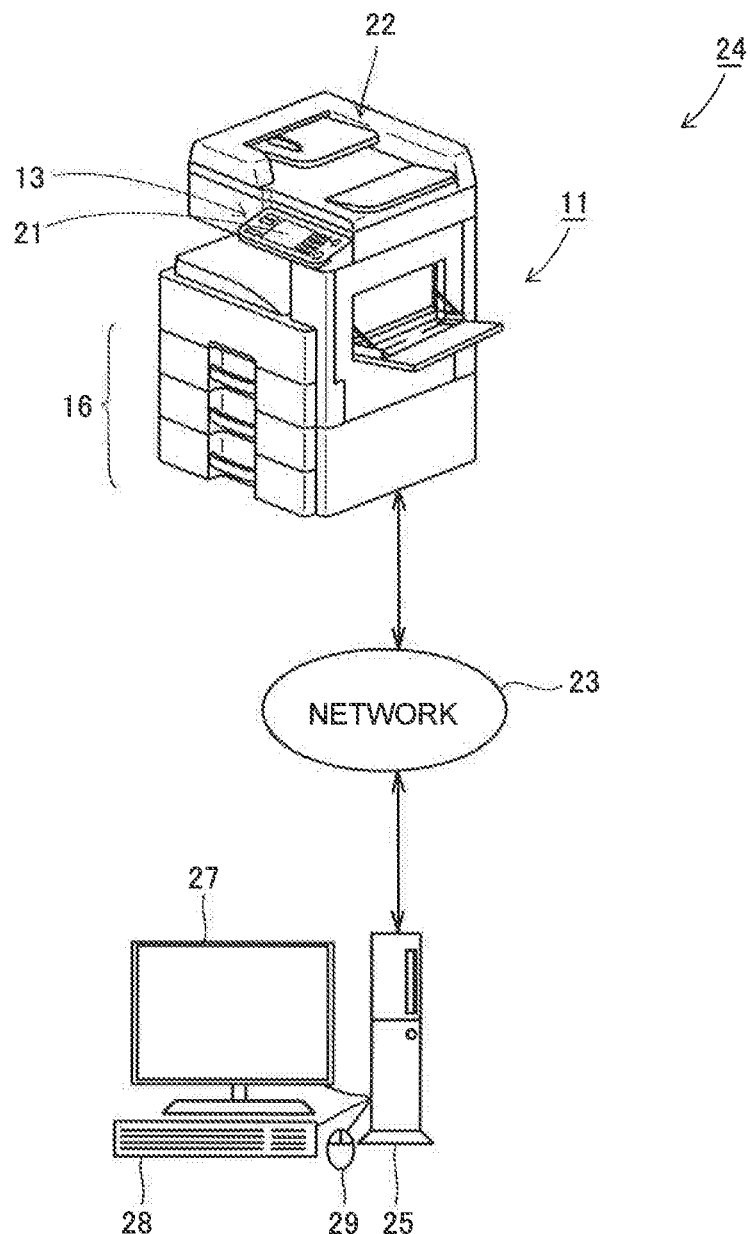
FIG. 1 is a schematic external view of a printing system according to an embodiment of the disclosure.
Figure 2:
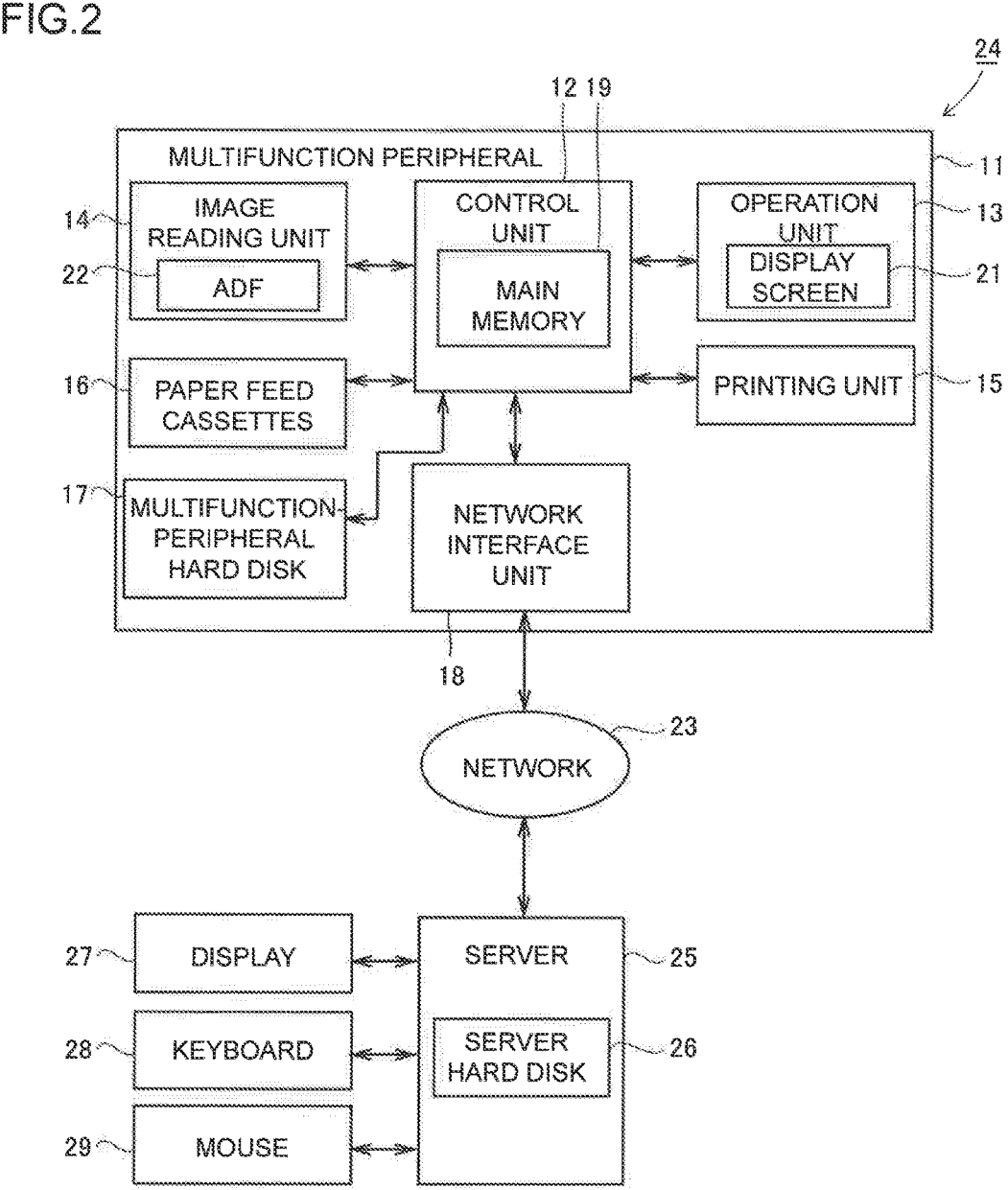
FIG. 2 is a block diagram showing the configuration of the printing system shown in FIG. 1.

Embodiments of the present disclosure will be described below. FIG. 1 is a schematic external view of a printing system 24 according to an embodiment of the present disclosure. FIG. 2 is a block diagram showing the configuration of the printing system 24 shown in FIG. 1.

Referring to FIGS. 1 and 2, the printing system 24 includes a multifunction peripheral 11, which is a printing device according to the embodiment of the disclosure, connectable to a network 23, and a server 25 connectable to the multifunction peripheral 11 via the network 23. The server 25 can make a print request to the multifunction peripheral 11 via the network 23.

Firstly, the configuration of the server 25 will be described. The server 25 is configured to be connectable to the multifunction peripheral 11 through the network 23. A display 27, a keyboard 28, and a mouse 29 are connected to the server 25. The display 27 displays information and data from the server 25. The user inputs data to the server 25 using the keyboard 28 or mouse 29.

The server 25 includes a server hard disk 26 serving as a storage unit storing data. The server hard disk 26 holds data of sample characters. The sample characters are ideally shaped characters that can be used as good examples when the characters are handwritten. In short, the server 25 is configured to include the server hard disk 26 storing the sample character data.

Next, the configuration of the multifunction peripheral 11 will be described. The multifunction peripheral 11 has a plurality of functions relating to image processing, such as a copying function, a printer function, and a facsimile function. The multifunction peripheral 11 includes a control unit 12, an operation unit 13, an image reading unit 14, a printing unit 15, paper feed cassettes 16, a multifunction-peripheral hard disk 17, and a network interface unit 18 used to connect with the network 23. The multifunction peripheral 11 can acquire data in the server hard disk 26 by accessing the server 25 via the network 23.

The control unit 12 controls the entire multifunction peripheral 11, and includes a main memory 19 that temporarily stores data. The operation unit 13 includes a display screen 21 that serves as a display unit displaying information submitted from the multifunction peripheral 11 and entries made by users. The operation unit 13 accepts inputs of image formation, such as image forming conditions including the number of copies and gradation degrees, from the users. The image reading unit 14 includes an auto document feeder (ADF) 22 serving as a document transporting device that transports an original document placed on a loading position to a reading position. The image reading unit 14 reads an image of the original document loaded in the ADF 22 or placed on a document table (not shown). Each of the paper feed cassettes 16 can hold a plurality of sheets of paper. The printing unit 15 forms an image on paper transported from the paper feed cassettes 16 or other paper feeders, based on image data of the original document read by the image reading unit 14 or image data transmitted via the network 23. The multifunction-peripheral hard disk 17 stores data relating to image formation, that is, the transmitted image data, the input image forming conditions, and so on.

Figure 3:
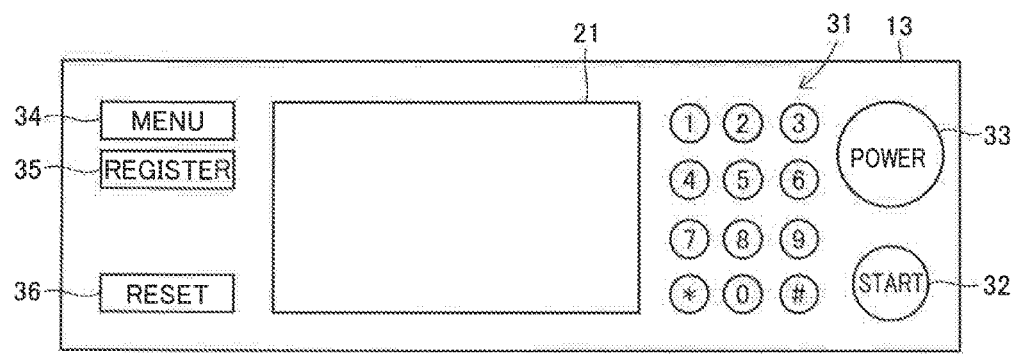
FIG. 3 illustrates the configuration of an operation unit.

Next, the configuration of the aforementioned operation unit 13 will be described. FIG. 3 is an external view schematically showing the configuration of the operation unit 13. Referring to FIG. 3, the operation unit 13 includes numeric keys 31 including number keys 0 to 9 used by users to input the number of copies or the like and symbol keys like "*" and "#", a start key 32 used to provide instructions to start printing and to send a fax, a power key 33 used to turn on and off the power source of the multifunction peripheral 11, a menu key 34 used to provide instructions to select one of the functions, such as a printer function or a copying function, of the multifunction peripheral 11, a register key 35 used to provide instructions to register various image forming conditions and user information, a reset key 36 used to cancel the instructions input by users with the numeric keys 31 and the other keys, and the aforementioned display screen 21. The above-described numeric keypad 31 and other keys are so-called hard keys. The display screen 21 is a liquid crystal display with a touch panel function that allows users to input image forming conditions and so on, and also allows the users to select from among the functions by pressing the display screen 21 with their fingers. Note that the display screen 21 can display a start key, menu key, and so on that can be used instead of the hard keys.

Figure 4:
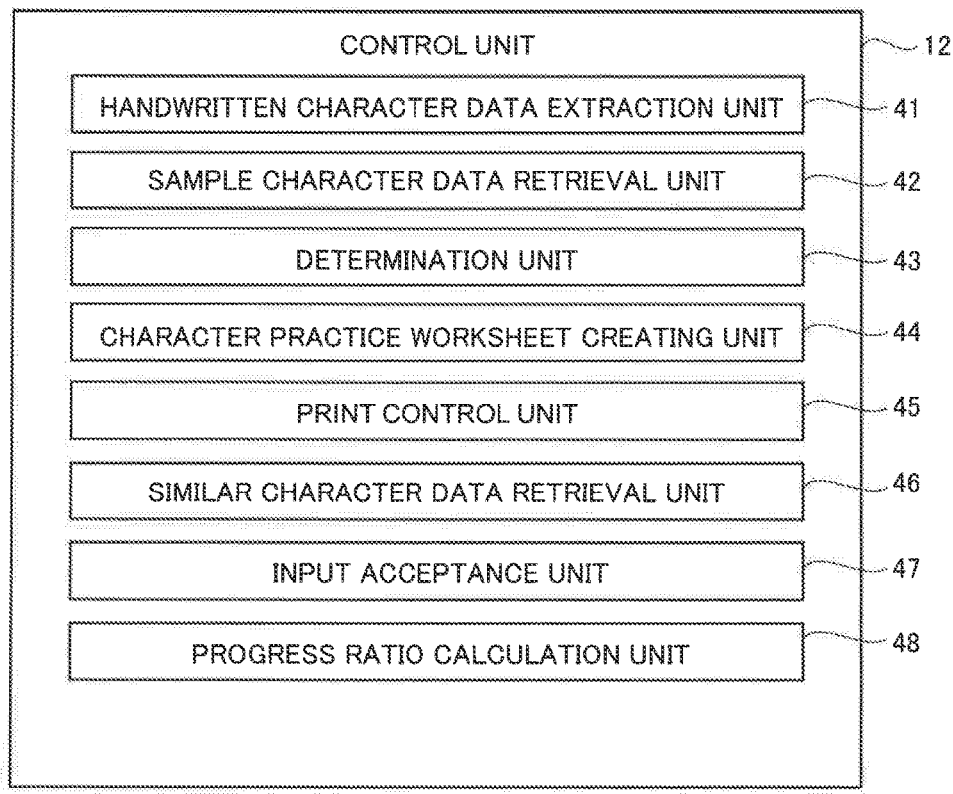
FIG. 4 is a block diagram showing the configuration of a control unit.

Next, the configuration of the control unit 12 will be described. FIG. 4 is a block diagram showing the configuration of the control unit 12. Referring to FIG. 4, the control unit 12 includes a handwritten character data extraction unit 41, a sample character data retrieval unit 42, a determination unit 43, a character practice worksheet creating unit 44, a print control unit 45, a similar character data retrieval unit 46, an input acceptance unit 47, and a progress ratio calculation unit 48.

The handwritten character data extraction unit 41 extracts a handwritten character, by means of OCR, from an image of an original document read by the image reading unit 14. The sample character data retrieval unit 42 retrieves data of a sample character that matches the handwritten character extracted by the handwritten character data extraction unit 41, from the server hard disk 26. The determination unit 43 determines whether the matching ratio between the handwritten character extracted by the handwritten character data extraction unit 41 and the sample character retrieved by the sample character data retrieval unit 42 is equal to a first ratio or lower. If the determination unit 43 determines that the matching ratio is equal to the first ratio or lower, the character practice worksheet creating unit 44 creates a character practice worksheet containing the sample character that matches the handwritten character and a blank cell for handwriting practice formed next to the sample character. The print control unit 45 controls the printing unit 15 to print the character practice worksheet created by the character practice worksheet creating unit 44 on paper.

The similar character data retrieval unit 46 retrieves data of a similar sample character that is similar to the handwritten character and is determined to match the handwritten character at a matching ratio equal to the first ratio or lower, from the server hard disk 26. The character practice worksheet creating unit 44 creates a character practice worksheet containing the similar sample character, which is retrieved by the similar character data retrieval unit 46, next to the sample character and a blank cell for handwriting practice formed next to the similar sample character.

The input acceptance unit 47 accepts an input of information about a target character learner who will practice writing characters with the character practice worksheet. The character practice worksheet creating unit 44 creates the character practice worksheet based on the target character learner information accepted by the input acceptance unit 47.

If the image reading unit 14 reads the filled-in character practice worksheet after practice, the progress ratio calculation unit 48 calculates the progress of the matching ratio obtained by the determination unit 43, and outputs the result.

Processing steps for creating and printing a character practice worksheet using the multifunction peripheral 11 will be described. In this processing, the multifunction peripheral 11 uses data of sample characters stored in the server hard disk 26 in the server 25.

Figure 5:
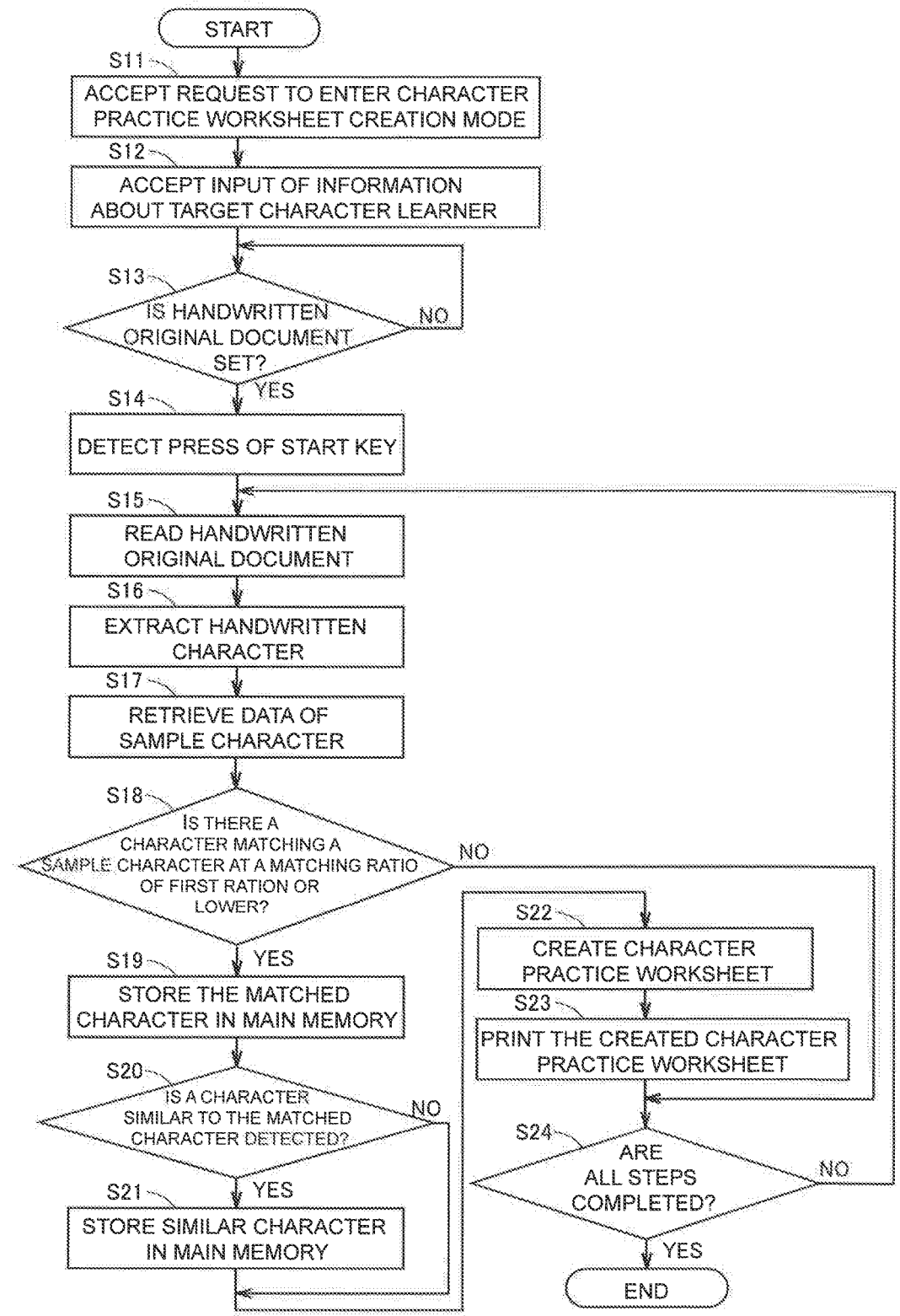
FIG. 5 is a flowchart of processing steps performed by a multifunction peripheral to create and print a character practice worksheet.

FIG. 5 is a flowchart of processing steps for creating and printing the character practice worksheet using the multifunction peripheral 11. Referring to FIG. 5, a creator of the character practice worksheet issues a request to the multifunction peripheral 11 to enter a character practice worksheet creation mode. This request is input by the worksheet creator through the operation unit 13. Then, the control unit 12 accepts the request to enter the character practice worksheet creation mode (step S11 in FIG. 5, hereinafter "step" is omitted). The creator of the character practice worksheet described herein is a user who intends to create a character practice worksheet, and includes, for example, cram school teachers and regular school teachers.

Then, the input acceptance unit 47 accepts the input of information about a target character learner who will practice writing characters (S12). Specifically, the information includes the age and grade of the target character learner.

Figure 6:
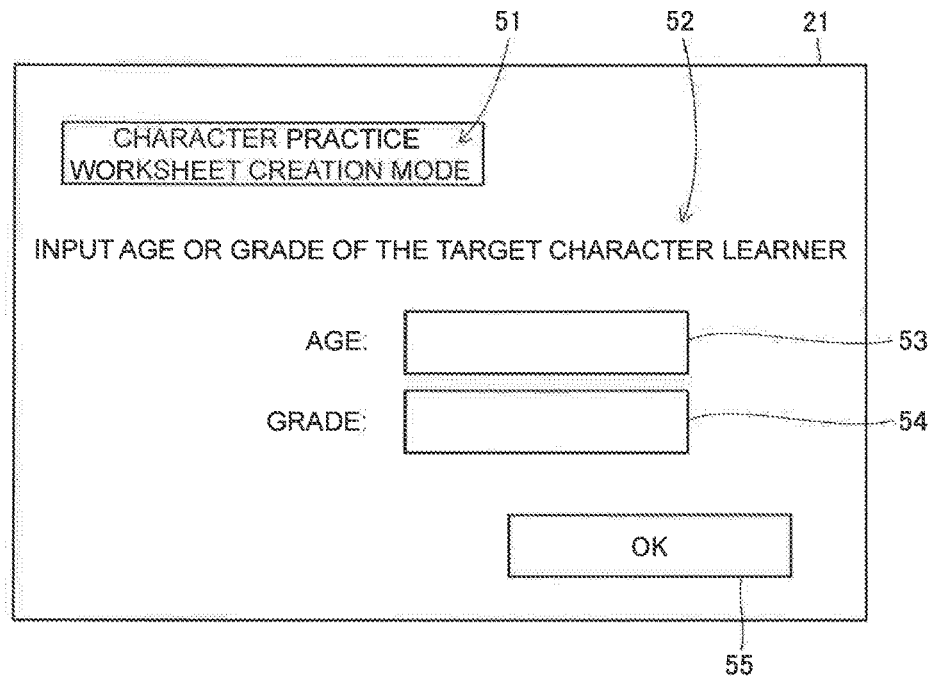
FIG. 6 illustrates an example display screen.

FIG. 6 illustrates an example of the display screen 21 when the information is input. Referring to FIG. 6, the display screen 21 displays a message 51 "Character practice worksheet creation mode", an inquiry message 52 "Input age or grade of the target character learner", an age entry field 53 in which a numeric value is input to accept the age of the target character learner, a grade entry field 54 in which a numeric value is input to accept the grade of the target character learner, and a confirmation key 55 that is labeled "OK" and is pushed down to confirm the inputs. In response to the input by the worksheet creator, the input acceptance unit 47 accepts the age or grade of the target character learner.

Next, it is determined whether an original handwritten document is set or not (S13). This original handwritten document is a document handwritten by the target character learner. The determination is made by examining whether the original handwritten document is loaded in the ADF 22. Alternatively, the determination is made by examining whether the original handwritten document is placed on the document stage.

If the original handwritten document is set (YES in S13) and a press of the start key 32 is detected (S14), the ADF 22 transports the original handwritten document to a reading position. At the reading position, the image reading unit 14 reads an image of the original handwritten document (S15). Subsequently, the handwritten character data extraction unit 41 extracts data of a handwritten character from the read image (S16). Specifically speaking, for example, a handwritten Hiragana character "あ (A)" and a handwritten Kanji character "道 (DOU)" are extracted from the original handwritten document. These handwritten characters are extracted using OCR.

After extraction of the handwritten character data, the sample character data retrieval unit 42 retrieves data of a sample character that matches the handwritten character from the server hard disk 26 (S17). Specifically, the sample character data retrieval unit 42 accesses the server hard disk 26, which stores the sample character data, via the network 23. Then, the sample character data retrieval unit 42 retrieves a sample character that matches the handwritten character extracted by the OCR from a large number of sample characters stored in the server hard disk 26. In this example, character data of a sample character "あ (A)" and a sample character "道 (DOU)" is retrieved.

After the retrieval of the sample character data, the determination unit 43 determines whether the matching ratio between the handwritten character extracted by the handwritten character data extraction unit 41 and the sample character retrieved by the sample character data retrieval unit 42 is equal to a first ratio or lower (S18). Specifically, for example, the handwritten character data is projected over the sample character data, and then the matching ratio is calculated based on the degree of overlap of the handwritten character on the sample character. The calculated matching ratio is compared with the first ratio to be determined whether it is equal to the first ratio or lower. The data of the calculated matching ratio is stored in the multifunction-peripheral hard disk 17.

If the determination unit 43 determines that the matching ratio is equal to the first ratio or lower, for example, is equal to 80% or lower (YES in S18), the corresponding character is stored in the main memory 19 (S19). In this example, the characters "あ (A)" and "道 (DOU)" are stored.

The determination unit 43 subsequently determines whether a character similar to the corresponding character is detected (S20). The detection of the similar character is made based on the age and grade of the target character learner input through the input acceptance unit 47. More specifically, the similar character is detected from data of Kanji characters that should be learned during the input age and grade.

If a similar character is detected (YES in S20), the similar character is stored in the main memory 19 (S21) in the same manner as the corresponding characters. In this example, a Kanji character "建 (KEN)" that is similar to the character "道 (DOU)", and a Kanji character "辺 (HEN)" that has a "Shinnyo (road)" radical in common with the character "道 (DOU)" are detected as similar characters of the character "道 (DOU)". In addition, a Hiragana character "

お (O)" is detected as a similar Hiragana character of the Hiragana character "あ (A)". Consequently, the character "お (O)", which is a similar character to the character "あ (A)", and the characters "建 (KEN)" and "辺 (HEN)", which are similar characters to the character "道 (DOU)", are stored in the main memory 19.

Next, the character practice worksheet creating unit 44 creates a character practice worksheet based on the corresponding character and similar character stored in the main memory 19 (S22).

Figure 7:
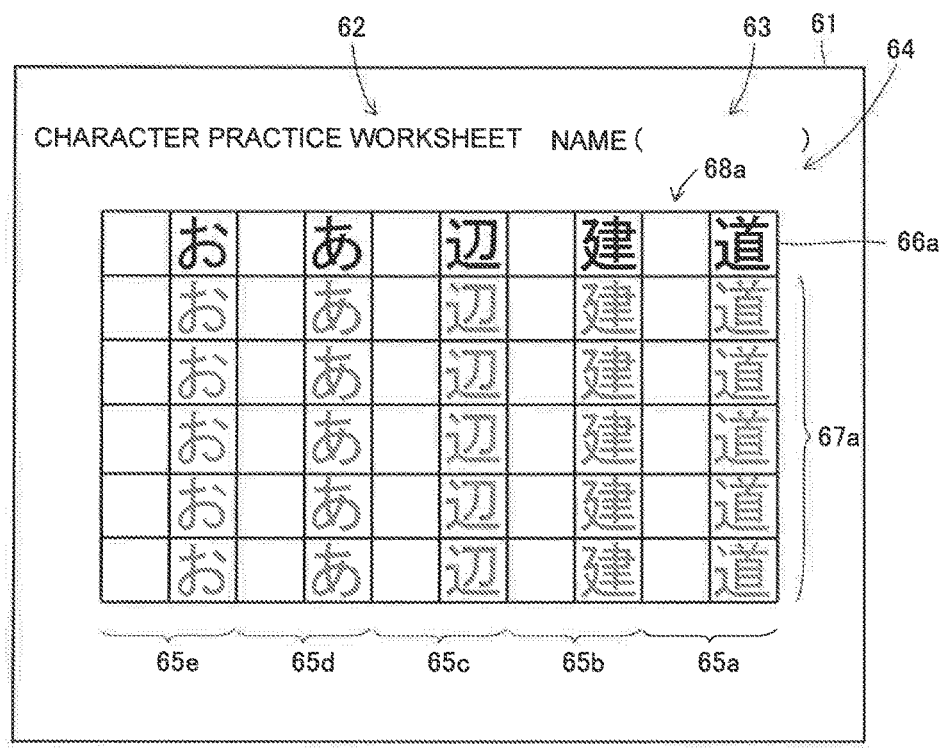
FIG. 7 illustrates an example created character practice worksheet.

FIG. 7 illustrates an example of a created character practice worksheet 61. Referring to FIG. 7, the character practice worksheet 61 includes a title 62 "Character practice worksheet", a name field 63, and a character practice area 64. The character practice area 64 of the character practice worksheet 61 shown in FIG. 7 is roughly divided into character practice sub-areas 65a, 65b, 65c, 65d, 65e associated with five characters respectively.

The character practice sub-area 65a is an area to practice the character "道 (DOU)", the character practice sub-area 65b is an area to practice the character "建 (KEN)", the character practice sub-area 65c is an area to practice the character "辺 (HEN)", the character practice sub-area 65d is an area to practice the character "あ (A)", and the character practice sub-area 65e is an area to practice the character "お (O)". The character practice sub-areas 65a, 65d corresponds to the characters extracted by the handwritten character data extraction unit 41. The character practice sub-areas 65b, 65c, 65e corresponds to the similar characters.

The character practice sub-area 65a is configured as follows. In the character practice sub-area 65a, a sample character 66a of the character "道 (DOU)" is clearly presented in black on the top right cell of the character practice sub-area 65a. Below the sample character 66a, provided are tracing characters 67a, which serve as practice characters, aligned across five cells. The tracing characters 67a are the character "道 (DOU)" colored in light gray and are used for practicing. On the left side of the sample character 66a and tracing characters 67a provided are six blank cells 68a. The character practice sub-areas 65b to 65e have the same configuration as the character practice sub-area 65a.

The print control unit 45 controls the printing unit 15 to print the created character practice worksheet 61 (S23). This process is performed until the next characters on the original handwritten document are read and subjected to the aforementioned steps completely (YES in S24).

The processing steps from creating to printing the character practice worksheet 61 have been described so far. Next, processing steps after handwriting practice is done will be described. The target character learner writes his/her name in the name field 63 and starts handwriting practice. Specifically, while looking at the sample character 66a for reference, the target character learner traces the tracing characters 67a, and then writes the corresponding character in the blank cells 68a by hand.

After the handwriting practice, the target character learner hands in the character practice worksheet 61 filled in with handwritten characters to the creator of the character practice worksheet 61. The worksheet creator calculates the progress ratio of the handwritten characters from the character practice worksheet 61. This means that the creator of the character practice worksheet 61 is a marker of the character practice worksheet.

Figure 8:
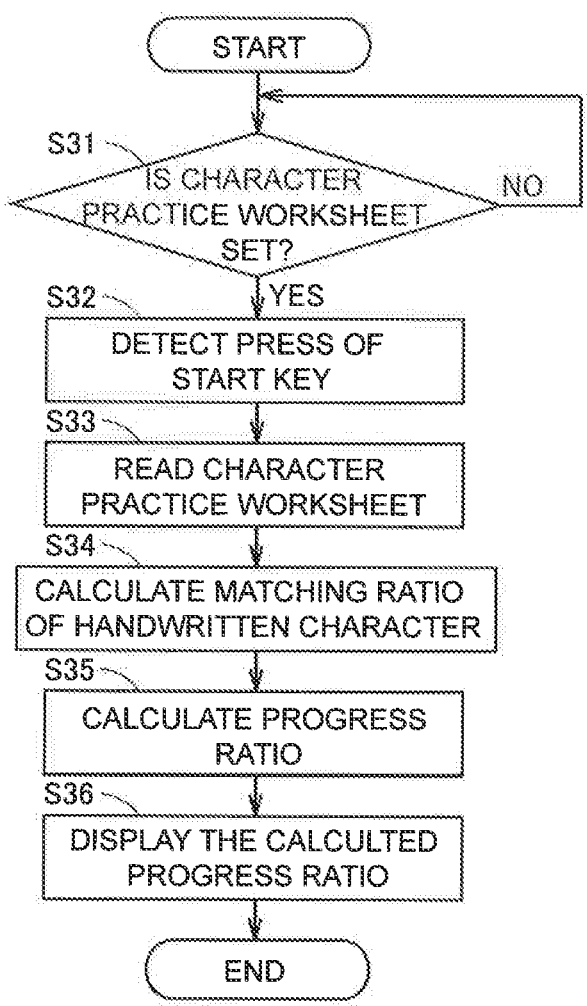
FIG. 8 is a flowchart of processing steps after handwriting practice using the character practice worksheet.

FIG. 8 is a flowchart of processing steps performed after handwriting practice using the character practice worksheet 61. Referring to FIG. 8, the creator of the character practice worksheet 61 sets the character practice worksheet 61 filled in with the handwritten character in the ADF 22 again.

If the character practice worksheet 61 is set in the ADF 22 (YES in S31) and a press of the start key 32 is detected (S32), the image reading unit 14 reads the character practice worksheet 61 set in the ADF 22 (S33).

After the reading process, the handwritten character is extracted, and the matching ratio of the handwritten character is calculated (S34). This matching ratio is also calculated based on the degree of overlap of the handwritten character on the sample character that matches the handwritten character.

Next, the progress ratio calculation unit 48 compares the matching ratio stored in the multifunction-peripheral hard disk 17 with the matching ratio that is calculated from the character practice worksheet 61 after practice to obtain the progress ratio (S35). Specifically, if the matching ratio stored in the multifunction-peripheral hard disk 17 is 70% and the matching ratio obtained from the read character practice worksheet 61 is 90%, the progress ratio is 20%. After the calculation of the progress ratio, the resultant progress ratio is displayed on the display screen 21 (S36).

As described above, when once an original handwritten document is read, the printing system 24 can extract a character to be practiced based on the matching ratio between a sample character and the handwritten character, and retrieves the sample character stored in the server hard disk 26 to create the character practice worksheet 61. Thus, the printing system 24 can readily create the character practice worksheet 61 for handwriting practice.

This printing system 24 is configured to include the similar character data retrieval unit 46 that retrieves data of a similar sample character that is similar to the handwritten character and is determined to match the handwritten character at a matching ratio equal to the first ratio or lower, from the server hard disk 26. The character practice worksheet creating unit 44 creates the character practice worksheet 61 containing the similar sample character, which is retrieved by the similar character data retrieval unit 46, disposed next to the sample character and a blank cell for handwriting practice formed next to the similar sample character. The configuration allows the target character learner to practice the similar character, and also allows the worksheet creator to create the character practice worksheet 61 as desired.

In this example, the character practice worksheet creating unit 44 also provides practice characters, which are made by applying gray color to the sample character, in cells for handwriting practice on the character practice worksheet 61. Thus the character practice worksheet creating unit 44 can create the character practice worksheet 61 that is very effective for the target character learner to practice writing the characters by hand.

Also, the printing system 24 is configured to include the input acceptance unit 47 that accepts an input of information about a target character learner who practices writing with the character practice worksheet 61. The character practice worksheet creating unit 44 is configured to create a character practice worksheet based on the target character learner information accepted by the input acceptance unit 47. This configuration can create a character practice worksheet 61 more suitable for the target character learner.

Furthermore, the printing system 24 is configured to include the progress ratio calculation unit 48 that, if the image reading unit 14 reads the filled-in character practice worksheet 61, calculates and outputs the progress ratio between the matching ratios obtained by the determination unit 43. The progress ratio calculation unit 48 allows the creator of the character practice worksheet 61 to readily recognize the progress ratio of the handwritten characters after the practice. If the result exhibits a low progress ratio and a lack of improvement in practice of the characters, the character practice worksheet 61 can be created and printed again. In addition, if the worksheet creator keeps track of the history of the created character practice worksheets 61, the worksheet creator can grasp the practice frequency of the target character learner.

In the above-described embodiment, the determination unit 43 can be configured to determine whether the matching ratio is equal to a second ratio, which is lower than the first ratio, or lower, and the printing system 24 can be configured to include a selection unit. If the determination unit 43 determines that the matching ratio is equal to the second ratio or lower, the selection unit lists up candidate characters that correspond to a handwritten character so that the creator of the character practice worksheet 61 can select a candidate character. This process is performed after extraction of handwritten characters in S16 of FIG. 5. Suppose that the first ratio is 80%, for example, 60% may be chosen as the second ratio. If the matching ratio is 60% or lower, there can be more than one correct character candidate. In this case, the selection unit lists up correct character candidates on the display screen 21, thereby allowing the creator of the character practice worksheet 61 to select a character. This configuration enables accurate extraction of characters to be practiced. If the matching ratio is extremely low, a large number of candidates will be listed up. In this case, the characters listed up as candidates can be randomized and stored in the main memory 19.

In the above-described embodiment, the sample character data is stored in the hard disk 26 of the server 25; however, the present disclosure is not limited thereto, and the sample character data can be stored in the multifunction-peripheral hard disk 17 of the multifunction peripheral 11. In other words, the multifunction peripheral 11 can be configured to include the multifunction-peripheral hard disk 17 serving as a storage unit that stores data of sample characters.

Thus, a multifunction peripheral 11, which serves as a printing device according to another embodiment of the disclosure, creates and prints a character practice worksheet for handwriting practice. The multifunction peripheral 11 includes an image reading unit 14, a printing unit 15, a handwritten character data extraction unit 41, a multifunction-peripheral hard disk 17 serving as a storage unit, a sample character data retrieval unit 42, a determination unit 43, a character practice worksheet creating unit 44, and a print control unit 45. The image reading unit 14 reads an image of an original document. The printing unit 15 forms an image to print it on paper. The handwritten character data extraction unit 41 extracts a handwritten character, by means of OCR, from the image of the original document read by the image reading unit 14. The multifunction-peripheral hard disk 17 stores data of sample characters. The sample character data retrieval unit 42 retrieves data of a sample character that matches the handwritten character extracted by the handwritten character data extraction unit 41, from the multifunction-peripheral hard disk 17. The determination unit 43 determines whether the matching ratio between the handwritten character extracted by the handwritten character data extraction unit 41 and the sample character retrieved by the sample character data retrieval unit 42 is equal to a first ratio or lower. If the determination unit 43 determines that the matching ratio is equal to the first ratio or lower, the character practice worksheet creating unit 44 creates a character practice worksheet containing the sample character that matches the handwritten character and a blank cell for handwriting practice formed next to the sample character. The print control unit 45 controls the printing unit 15 to print the character practice worksheet created by the character practice worksheet creating unit 44 on paper. The multifunction peripheral 11 can be configured as described above. Of course, the multifunction-peripheral hard disk 17 can be also configured to store data of similar sample characters in this embodiment.

In the above-described embodiments, the handwritten character data extraction unit 41 can be configured to remove a colored character that is written by the marker of the character practice worksheet 61 from characters to be extracted. Since the possibility that the colored character has been handwritten by a person other than the target character learner is high, removal of the colored character from the characters to be extracted can help create a character practice worksheet 61 with high accuracy for the target character learner.

Although the character practice worksheet 61 is created based on the information about the target character learner accepted by the input acceptance unit 47 in the above-described embodiments, the present disclosure is not limited thereto, and can be configured not to include the input acceptance unit 47 so that the character practice worksheet 61 is created irrespective of the information about the target character learner. In addition, the information about the target character learner is not limited to the age and grade of the target character learner, but can include other types of information, for example, the number of times the target character learner has practiced.

Although the multifunction peripheral 11 is configured to include the similar character data retrieval unit 46 in the above-described embodiments, the present disclosure is not limited thereto, but the multifunction peripheral 11 can be configured without the similar character data retrieval unit 46, and the similar characters do not need to be incorporated in the character practice worksheet 61. If there are a large number of similar characters, randomly selected similar characters can be incorporated in the character practice worksheet 61.

Although the character practice worksheet 61 created herein includes the practice character, which is made by applying gray color to the sample character and are presented in the cell for handwriting practice in the above-described embodiments, the character practice worksheet creating unit 44 can create the character practice worksheet 61 with a plurality of the practice characters colored in different gray shades in the practice cells. With the characters in different gray shades, the target character learner can efficiently practice handwriting on the character practice worksheet 61. Furthermore, the form of the character practice worksheet 61 is not limited to the form shown in FIG. 7, and can be changed into any forms upon request of the worksheet creator. Specifically, the worksheet creator can add the stroke order of the sample characters, or can increase the number of the tracing characters 67a in gray. For Kanji, it is possible to apply gray color to only the radical of a Kanji character. In addition, the sample character can be presented only with a thin dashed guide line. Furthermore, it is possible to apply gray color to only a part having a low matching ratio in a Kanji character.

The handwritten character data extraction unit 41 in the above-described embodiments can be configured to utilize the form of an original document to extract a handwritten character. In this case, the original document before being handwritten is read by the image reading unit 14 and utilized. Specifically, the image reading unit 14 reads an original document before being handwritten and the original document after being handwritten, and the handwritten character data extraction unit 41 extracts handwritten character data based on the difference between the not-yet-handwritten original document and the handwritten original document read by the image reading unit 14. In this case, the original document before being handwritten can be read either before or after reading the handwritten original document. This configuration facilitates extraction of handwritten characters.

It should be understood that the embodiments disclosed herein are illustrative and non-restrictive in every respect. The scope of the present disclosure is defined by the terms of the claims, rather than by the foregoing description, and is intended to include any modifications within the scope and meaning equivalent to the terms of the claims.

The printing system and printing device according to the present disclosure can be effectively used especially to meet a demand for easy creation of a character practice worksheet for handwriting practice.

What is claimed is:

1. A printing system creating and printing a character practice worksheet for handwriting practice, comprising:
   a printing device; and a server connectable to the printing device,
   wherein the server includes
   a storage unit storing data of sample characters,
   wherein the printing device includes
   an image reading unit reading an image of an original document,
   a printing unit forming an image to print the image on paper,
   a handwritten character data extraction unit extracting a handwritten character, by means of optical character recognition (OCR), from the image of the original document read by the image reading unit,
   a sample character data retrieval unit retrieving data of a sample character that matches the handwritten character extracted by the handwritten character data extraction unit,
   a determination unit determining whether the matching ratio between the handwritten character extracted by the handwritten character data extraction unit and the sample character retrieved by the sample character data retrieval unit is equal to a first ratio or lower,
   a character practice worksheet creating unit, if the determination unit determines that the matching ratio is equal to the first ratio or lower, creating a character practice worksheet containing the sample character that matches the handwritten character and a blank cell for handwriting practice formed next to the sample character, and
   a print control unit controlling the printing unit to print the character practice worksheet created by the character practice worksheet creating unit on paper.

2. The printing system according to claim 1, further comprising
   similar character data retrieval unit retrieving data of a similar sample character that is similar to the handwritten character and is determined to match the handwritten character at a matching ratio equal to the first ratio or lower, from the storage unit, wherein
   the character practice worksheet creating unit creates a character practice worksheet containing the similar sample character, which is retrieved by the similar character data retrieval unit, next to the sample character, and a blank cell for handwriting practice next to the similar sample character.

3. The printing system according to claim 1, wherein
   the character practice worksheet creating unit creates the character practice worksheet containing a practice character, which is made by applying gray color to the sample character, in the cell for handwriting practice.

4. The printing system according to claim 3, wherein
   the character practice worksheet creating unit creates the character practice worksheet containing a plurality of practice characters colored in different gray shades in the cells for handwriting practice.

5. The printing system according to claim 1, wherein
   the determination unit determines whether the matching ratio is equal to a second ratio, which is lower than the first ratio, or lower, and
   the printing system further comprising a selection unit, if the determination unit determines that the matching ratio is equal to the second ratio or lower, listing up candidate sample characters that correspond to the handwritten character so that a creator of the character practice worksheet can select a candidate sample character.

6. The printing system according to claim 1, further comprising
   an input acceptance unit accepting an input of information about a target character learner who will practice writing characters with the character practice worksheet, wherein the character practice worksheet creating unit creates the character practice worksheet based on the information about the target character learner accepted by the input acceptance unit.

7. The printing system according to claim 6, wherein
   the information about the target character learner is at least one of the age and grade of the target character learner.

8. The printing system according to claim 1, wherein
   if the image reading unit reads an original document before being handwritten and the original document after being handwritten, the handwritten character data extraction unit extracts handwritten character data based on the difference between the original document before being handwritten and the original document after being handwritten read by the image reading unit.

9. The printing system according to claim 1, further comprising
   a progress ratio calculation unit, if the image reading unit reads the character practice worksheet after being practiced, calculating and outputting a progress ratio between the matching ratios obtained by the determination unit.

10. A printing device creating and printing a character practice worksheet for handwriting practice, comprising:
    an image reading unit reading an image of an original document;
    a printing unit forming an image to print the image on paper;
    a handwritten character data extraction unit extracting a handwritten character, by means of optical character recognition (OCR), from the image of the original document read by the image reading unit;

a storage unit storing data of sample characters;

a sample character data retrieval unit retrieving data of a sample character that matches the handwritten character extracted by the handwritten character data extraction unit;

a determination unit determining whether the matching ratio between the handwritten character extracted by the handwritten character data extraction unit and the sample character retrieved by the sample character data retrieval unit is equal to a first ratio or lower;

a character practice worksheet creating unit, if the determination unit determines that the matching ratio is equal to the first ratio or lower, creating a character practice worksheet containing the sample character that matches the handwritten character and a blank cell for handwriting practice formed next to the sample character; and a print control unit controlling the printing unit to print the character practice worksheet created by the character practice worksheet creating unit on paper.

\* \* \* \* \*